United States Patent [19]

Kobayashi et al.

[11] Patent Number: 5,612,125
[45] Date of Patent: Mar. 18, 1997

[54] PROCESS FOR PRODUCING PREPREG

[75] Inventors: Seizo Kobayashi, Yokohama; Kazutosi Nomiyama, Akishima; Yoshimu Iwanami; Sumio Yoshida, both of Yokohama; Kazuhiko Kurihara, Tokyo; Hiroshi Yazawa, Kunitachi, all of Japan

[73] Assignees: Nippon Oil Co., Ltd.; Nippon Petrochemicals Co., Ltd.; Polymer Processing Research Institute Ltd., all of Tokyo, Japan

[21] Appl. No.: 354,268

[22] Filed: Dec. 12, 1994

Related U.S. Application Data

[63] Continuation of Ser. No. 886,939, May 22, 1992, abandoned.

[30] Foreign Application Priority Data

May 27, 1991 [JP] Japan .................................. 3-121404

[51] Int. Cl.$^6$ .......................... B29C 70/50; B29C 70/10
[52] U.S. Cl. .......................... 442/170; 264/126; 264/137; 264/147; 264/257; 264/289.3; 264/DIG. 47; 428/902
[58] Field of Search ............................ 264/DIG. 47, 137, 264/147, 288.4, 136, 289.3, 340, 122, 126, 257, 258; 428/245, 288, 902

[56] References Cited

U.S. PATENT DOCUMENTS

| | | | |
|---|---|---|---|
| 3,503,836 | 3/1970 | Rasmussen | 264/DIG. 47 |
| 3,550,826 | 12/1970 | Salmela | 264/DIG. 47 |
| 3,577,724 | 5/1971 | Greene | 264/DIG. 47 |
| 3,662,935 | 5/1972 | Yazawa et al. | 225/97 |
| 4,129,632 | 12/1978 | Olson et al. | 264/DIG. 47 |
| 4,134,951 | 1/1979 | Dow et al. | 264/DIG. 47 |
| 4,310,478 | 1/1982 | Balslev et al. | 264/DIG. 47 |
| 4,403,012 | 9/1983 | Harpell et al. | 264/271.1 |
| 4,413,110 | 11/1983 | Kavesh et al. | 264/210.8 |
| 4,612,148 | 9/1986 | Motooka et al. | 264/210.6 |
| 4,616,059 | 10/1986 | Motooka et al. | 264/210.6 |
| 4,814,131 | 3/1989 | Atlas | 264/DIG. 47 |
| 4,853,164 | 8/1989 | Kiang et al. | 264/289.3 |

(List continued on next page.)

FOREIGN PATENT DOCUMENTS

| | | | |
|---|---|---|---|
| 0046526 | 3/1982 | European Pat. Off. | 264/126 |
| 0253513 | 1/1988 | European Pat. Off. | |
| 2505710 | 8/1975 | Germany | 264/147 |
| 3744348 | 7/1989 | Germany | |
| 1197465 | 7/1970 | United Kingdom | 264/147 |

OTHER PUBLICATIONS

Thesaurus of Textile Terms, 2nd ed., Backer and Valko ed., MIT Press, Cambridge Mass: 1969 pp. 206, 210.

World Patents Index Latest, AN 91-106922, & JP-A-3 049 949, Mar. 4, 1991, "Laminate Contg. Polyethylene Cloth or Yarns as Core Layer—Composed of Core of Cloth of Ultra High Mol. Wt. Ethylene! Polymer Fibres, Outer Layer(s) . . . ".

World Patents Index Latest, AN 91-161298, & JP-A-3 097 977, Apr. 23, 1991, "Dyeing Fibrous Cloth of Polyethylene Super-High Polymer—by Treating with Low Temp. Plasma Then Impregnating with Epoxy! Resin, Curing Agent . . . ".

*Primary Examiner*—Jay H. Woo
*Assistant Examiner*—Duane S. Smith
*Attorney, Agent, or Firm*—Oblon, Spivak, McClelland, Maier & Neustadt, P.C.

[57] ABSTRACT

The present invention provides a prepreg obtained by stretching a material including, as a main component, an ultra-high-molecular-weight polyethylene having an intrinsic viscosity of 5–50 dl/g as measured at 135° C. in decalin, to a total draw ratio of at least 20, subjecting the resulting stretched polyethylene material to a splitting treatment, and impregnating the resulting material with a thermosetting resin, and a process for producing said prepreg. The split stretched polyethylene material has improved adhesion to the impregnant resin and can be used as a good base material for prepreg.

15 Claims, 2 Drawing Sheets

U.S. PATENT DOCUMENTS

| | | | |
|---|---|---|---|
| 4,876,049 | 10/1989 | Aoyama et al. | 264/259 |
| 4,902,460 | 2/1990 | Yagi et al. | 264/340 |
| 4,996,011 | 2/1991 | Sano et al. | 264/126 |
| 5,026,511 | 6/1991 | Sano et al. | 264/126 |
| 5,051,183 | 9/1991 | Takita et al. | 264/288.4 |
| 5,091,133 | 2/1992 | Kobayashi et al. | 264/126 |
| 5,106,555 | 4/1992 | Kobayashi et al. | 264/126 |
| 5,106,558 | 4/1992 | Kobayashi et al. | 264/126 |

PROCESS FOR PRODUCING PREPREG

This application is a Continuation of application Ser. No. 07/886,939, filed on May 22, 1992, now abandoned.

BACKGROUND OF THE INVENTION a) Field of the Invention

The present invention relates to a prepreg and a process for producing the prepreg. More particularly, the present invention relates to a prepreg using, as a base material, a particular ultra-high-molecular-weight polyethylene stretched material, as well as to a process for producing the prepreg.

b) Description of the Related Art

It is known to mold an ultra-high-molecular-weight polyethylene into a fiber, a sheet or a tape and then stretch the fiber, sheet or tape to obtain a high-strength and high-modulus polyethylene material. For example, Japanese Patent Application Laid-Open No. 130313/1984 describes a process which comprises melt-mixing an ultra-high-molecular-weight polyethylene and a wax, extruding the resulting mixture, and cooling, solidifying and then stretching the extrudate; Japanese Patent Application Laid-Open No. 101032/1985 describes a process which comprises cooling an ultra-high-molecular-weight polyethylene solution, compression-molding the resulting gel-like material, and stretching the compression-molded product; and EP 253513A1 (1988) describes a process which comprises compression-molding an ultra-high-molecular-weight polyethylene at a temperature lower than the melting point of the polyethylene and stretching the compression-molded product. The ultra-high-molecular-weight polyethylene fibers, sheets or tapes obtained by the above processes are lightweight and have a high strength and a high modulus; therefore, it is expected to use them in various applications by, for example, making them into laminates, or using them as a reinforcing material and mixing them with other materials to obtain composite materials.

The ultra-high-molecular-weight polyethylene, however, has no polar group and consequently has an inactive surface. This has made generally difficult its adhesion to other materials (the sheet- or tape-shaped polyethylene, in particular, has a restricted surface area and its adhesion to other materials has been insufficient), and the ultra-high-molecular-weight polyethylene has been difficult to make into composite materials such as prepreg and the like.

OBJECTS AND SUMMARY OF THE INVENTION

An object of the present invention is to provide a material for composite material, such as prepreg or the like, using an ultra-high-molecular-weight polyethylene material.

Another object of the present invention is to provide a material for composite material, of excellent adhesion, using an ultra-high-molecular weight polyethylene material having no polar group and consequently an inactive surface.

Still another object of the present invention is to provide a material for composite material, using a sheet- or tape-shaped ultra-high-molecular-weight polyethylene material having a restricted surface area for adhesion.

Yet another object of the present invention is to provide a process for producing the above material.

The present inventors made study in order to achieve the above objects. As a result, the present inventors found that a sheet- or tape-shaped stretched material comprising, as a main component, a particular ultra-high-molecular weight polyethylene, when subjected to a splitting treatment, has a remarkably increased surface area and consequently, when impregnated with a thermosetting resin, can physically bond to the resin, making it possible to obtain a prepreg using a split stretched polyethylene material as a base material. The present inventors further found that when the split stretched polyethylene material is subjected to a surface treatment prior to impregnation with a thermosetting resin, the above effect imparted by the splitting treatment is significantly enhanced.

The present invention relates to a process for producing a prepreg, which comprises stretching a material comprising, as a main component, an ultra-high-molecular-weight polyethylene having an intrinsic viscosity of 5–50 dl/g as measured at 135° C. in decalin, to a total draw ratio of at least 20, subjecting the resulting stretched polyethylene material to a splitting treatment, and impregnating the resulting material with a thermosetting resin.

The present invention further relates to a process for producing a prepreg, which comprises subjecting the above-mentioned stretched polyethylene material to a splitting treatment and a surface treatment in this order or to a surface treatment and a splitting treatment in this order and then impregnating the resulting material with a thermosetting resin.

According to the above-mentioned process of the present invention, a stretched polyethylene material having a high strength, when subjected to a particular treatment, can be effectively used as a base material for prepreg, making it possible to produce therewith a prepreg used for laminate of high strength and lightweightness.

Further, since the stretched polyethylene material is produced without using any solvent or in a non-molten and substantially solid state, a prepreg or composite material of high performance can be produced at a cost far lower than before.

DETAILED DESCRIPTION OF THE INVENTION

Ultra-High-Molecular-Weight Polyethylene

Figure 1:
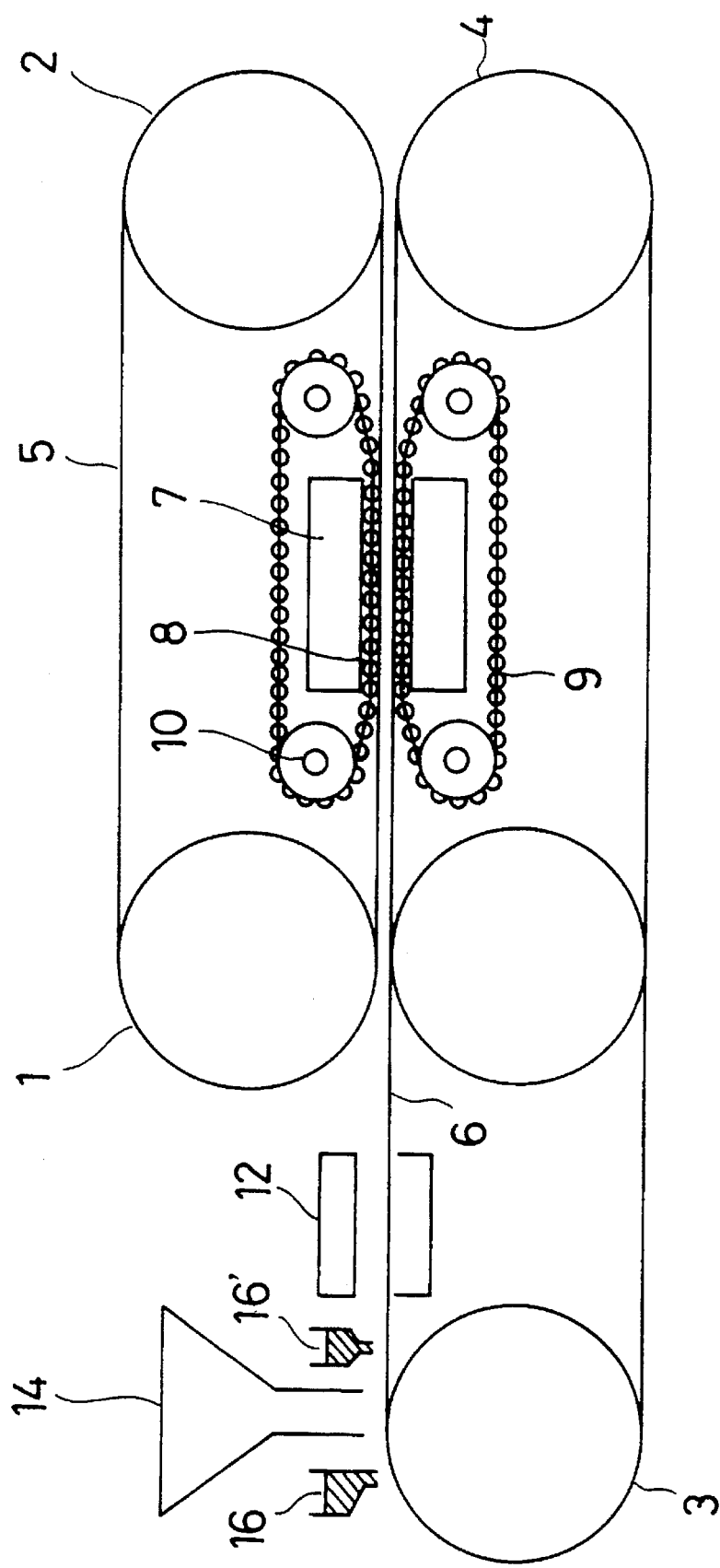
FIG. 1 is an example of the schematic illustration showing the apparatus used in the production process of the present invention.

The ultra-high-molecular-weight polyethylene used in the present invention has an intrinsic viscosity of 5–50 dl/g, preferably 8–40 dl/g, more preferably 10–30 dl/g as measured at 135° C. in decalin, which corresponds to a viscosity-average molecular weight of 500,000–12,000,000, preferably 900,000–9,000,000, more preferably 1,200,000–6,000,000. An intrinsic viscosity lower than 5 dl/g gives a stretched material of low mechanical strengths and consequently a prepreg of low strength. On the other hand, when the intrinsic viscosity is higher than 50 dl/g, the ultra-high-molecular weight polyethylene tends to have low processability in stretching, etc.

The form of the ultra-high-molecular-weight polyethylene is not particularly restricted. However, a granular or powdery polyethylene is preferred ordinarily. For example, the particle diameter is desired to be 2,000 µm or less, preferably 1–2,000 µm, more preferably 10–1,000 µm; and the particle diameter distribution is not particularly restricted but is preferred to be narrow ordinarily.

The ultra-high-molecular-weight polyethylene having the above-mentioned properties, employed in the present invention can be obtained by homopolymerizing ethylene or copolymerizing ethylene and an α-olefin of 3 or more carbon atoms, etc. in the presence of a catalyst which comprises (a) a catalyst component containing at least one compound (e.g. a titanium compound, a vanadium compound, a chromium compound, a zirconium compound, a hafnium compound) of at least one transition metal element of groups IV–VI of the periodic table and, as necessary, (b) an organometal compound.

As the α-olefin, there is used an α-olefin ordinarily having 3–12 carbon atoms, preferably 3–6 carbon atoms. Specific examples include propylene, butene-1, 4-methyl-pentene-1, hexene-1, octene-1, decene-1 and dodecene-1.

Among these, particularly preferred are propylene, butene-1, 4-methylpentene-1 and hexene-1. It is possible to further use in combination one or more dienes as comonomer or comonomers, for example, butadiene, 1,4-hexadiene, vinylnorbornene, ethylidene-norbornene and the like. The content of the α-olefin in the ethylene-α-olefin copolymer is ordinarily 0.001–10 mole %, preferably 0.01–5 mole %, more preferably 0.1–1 mole %.

Production of Stretched Polyethylene Material

The method used for stretching the material containing, as a main component, an ultra-high-molecular-weight polyethylene having an intrinsic viscosity of 5–50 dl/g as measured at 135° C. in decalin, includes, for example, a method wherein the polyethylene is melted, made into a film and then stretched; a method wherein the polyethylene is dissolved in a large amount of a solvent and the resulting gel-like material of sheet shape is rolled and then stretched; and a method wherein the polyethylene itself is stretched in a solid state, as described below in detail, without being dissolved in a solvent or without being melted. Of these, preferred is the method wherein the polyethylene is stretched in a solid state.

In the method wherein the polyethylene is stretched in a solid state, the ultra-high-molecular-weight polyethylene is stretched at a temperature lower than the melting point of the polyethylene. It is generally preferable to carry out, prior to the stretching, rolling of the polyethylene at a temperature lower than the melting point of the polyethylene. It is more preferable to carry out, prior to the rolling, compression molding of the polyethylene at a temperature lower than the melting point of the polyethylene. It is most preferable to carry out compression molding, rolling and stretching of the polyethylene in this order.

The method of compression molding is not particularly restricted, and any of a batchwise method and a continuous method can be employed. The batchwise compression molding method includes methods using various apparatuses of sliding type or rotary type. The continuous compression molding method includes various methods, for example, a method wherein a powder containing, as the main component, the above-mentioned ultra-high-molecular-weight polyethylene is held between a pair of upper and lower endless belts opposed to each other and is compression-molded while the endless belts are transferred. A continuous compression molding method is preferable in the present invention in view of the workability and the productivity of long stretched material.

Such a continuous compression molding step is described in more detail. First, brief description is made on FIG. 1 which shows an example of the apparatus used for the step.

The apparatus is fundamentally constructed of a pair of upper and lower endless belts 5,6 opposed to each other and maintained taut by rolls 1–4, two platens 7 for compressing a powder via the endless belts 5,6, and two sets of rollers 8 with each set of rollers connected to each other and rotatably disposed between the corresponding platen and the corresponding endless belt.

The compressing means in the present invention comprises two platens each arranged inside the corresponding endless belt and two sets of rollers with each set of rollers rotatably disposed between the corresponding platen and the corresponding endless belt. Preferably, each set of rollers has a number of rollers arranged closely at intervals only sufficient to avoid their mutual contact with their axes of rotation extending substantially at right angles relative to the travelling direction of the corresponding endless belt.

These rollers are rotatable about their corresponding central shafts. These shafts are fixed at both ends thereof on corresponding chains 9. The chains 9 are maintained in engagement with corresponding sprockets 10 arranged on both upstream and downstream sides of the corresponding platens 7, whereby these rollers are moved preferably at a line speed about half the running speed of the endless belts.

Each set of rollers may be fixed to, for example, a frame or the like provided between the endless belt and the platen.

No particular limitation is imposed on the platens, as long as their surfaces at which the platens are brought into contact with the corresponding rollers are smooth and can evenly transmit pressure.

Figure 2:
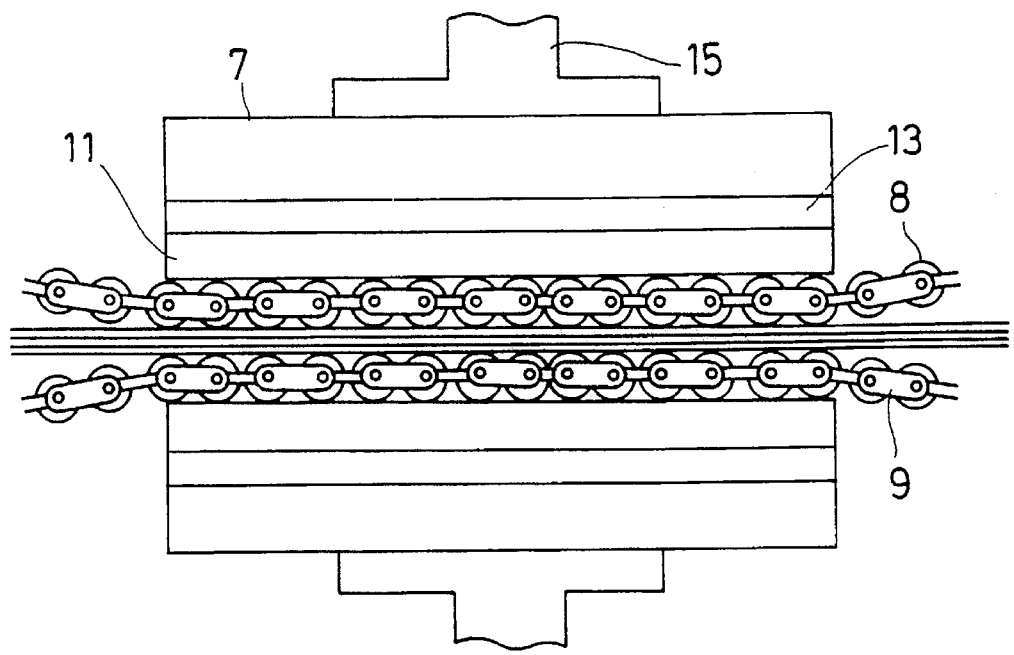
FIG. 2 is an example of the enlarged illustration showing the compressing zone and its vicinity of the apparatus of FIG. 1.

The length of each platen in the running direction of the corresponding endless belt is not particularly restricted, but is usually 30–400 cm, with about 50–200 cm being preferred. Although it is the primary role of the platens to compress the ultra-high-molecular-weight polyethylene powder via the endless belts, the platens may also be used as a heating means for the powder. It is practical and convenient to arrange a heating means 11 in each platen 7 as shown in FIG. 2 so that the powder can be heated by the platen via the corresponding rollers and the corresponding endless belt. It is also practical and convenient to arrange a preheater 12 in the proximity of the endless belt 6 as depicted in FIG. 1 so that the powder can be heated by the preheater 12.

As to the manner of arrangement of the heating means 11 in each platen, an electric heater can be embedded within the platen 7 after providing the platen with a heat insulation layer 13. As an alternative, a flow passage for the circulation of a heating medium can be disposed inside each platen to heat the platen with the heating medium.

In practising the production process of the present invention by using the illustrative apparatus, the ultra-high-molecular-weight polyethylene powder charged and stored in a hopper 14 is dropped onto the endless belt 6. Optionally, a polyolefin powder or the like having a lower melting point than the ultra-high-molecular-weight polyethylene powder is scattered from scatters 16,16'.

The appropriate running speed of each endless belt is generally 10–500 cm/min, preferably about 50–200 cm/min, although it also depends on the length of the platen and the conditions for the compression molding. The ultra-high-molecular-weight polyethylene powder or its mixture with an olefin polymer, which is placed on the endless belt 6, is formed into a predetermined cross-sectional shape by a doctor blade; is preheated by the preheater 12 if necessary; then, is conveyed to a squeezing zone defined by the upper and lower endless belts and further to a compression zone where the two sets of rollers and the platens are arranged. In the compression zone, a pressure from a hydraulic cylinder (not shown) is transmitted to a hydraulic piston 15 and then to each platen 7, and further is applied to the powder via the rollers and the endless belts. In this case, heat from each heating means is also transmitted similarly to the powder via the rollers and the endless belts, whereby the temperature of the powder is maintained at a predetermined temperature.

After the powder has been compression-molded as described above and the resulting sheet has been conveyed past the rolls 2 and 4, the sheet leaves the endless belts 5,6. Thus, a compression-molded sheet is formed continuously.

In the present invention, the pressure employed during compression molding can be selected within a wide range, but desirably is selected within the range of ordinarily 0.01 MPa to 2 GPa, preferably 1–500 MPa. When the compression molding is carried out continuously, even a low pressure of ordinarily 0.01–10 MPa, preferably about 0.1–5 MPa enables satisfactory compression molding in some cases by appropriately selecting the compression molding conditions. The temperature employed during compression molding is preferably lower than the melting point of the ultra-high-molecular-weight polyethylene and is ordinarily 20° C. to a temperature lower than the melting point, preferably 90°–140° C., more preferably 110°–135° C.

Next, description is made on the rolling step. A known rolling method such as rolling by pressure rolls can be used. The ultra-high-molecular-weight polyethylene or the above-mentioned compression-molded sheet of ultra-high-molecular-weight polyethylene is squeezed by pressure rolls which rotate in opposite directions, while maintaining the polyethylene or the sheet in a solid state without melting it, whereby a rolled sheet or film is obtained. In this case, the deformation ratio of the material by the rolling operation can be selected in a wide range. It is selected in the range of usually 1.2–20, preferably 1.5–10 in terms of rolling efficiency (length after rolling/length before rolling). The rolling temperature is generally not lower than 20° C. but below the melting point of the ultra-high-molecular-weight polyethylene powder employed in the present invention, preferably not lower than 50° C. but below the melting point, more preferably 90°–140° C., most preferably 110°–135° C. The above rolling operation may of course be carried out in two or more stages.

Stretching can be carried out by various methods. Any stretching method can be used as long as the objects of the present invention are not impaired. As the heating means, there can be used hot air stretching, cylinder stretching, roll stretching, hot plate stretching, etc. As the means for applying a tension for stretching, there can be used two pairs of nip rolls, crowbar rolls or Nelson rolls, rotating at different speeds, and multi-stage rolls.

The stretching temperature is lower than the melting point of the material to be stretched, and is generally 20°–160° C., preferably 60°–150° C., more preferably 90°–145° C., particularly preferably 90°–140° C. The stretching step can be performed not only in one stage but also in multiple stages. When the stretching step is carried out in multiple stages, it is preferred to carry out the later stage at a higher temperature than the former stage.

The stretching speed varies depending on the method of stretching and the molecular weight and composition of the polymer, and can be determined appropriately. It is usually in the range of 1 mm/min to 500 m/min. Specifically, in the case of batchwise stretching, the stretching speed is usually in the range of 1–500 mm/min, preferably 1–100 mm/min, more preferably 5–50 mm/min. In the case of continuous stretching, the stretching speed is usually in the range of 0.1–500 m/min, preferably 1–200 m/min, more preferably 10–200 m/min. Taking the economy into consideration, setting of a high stretching speed is preferred.

With respect to the draw ratio, it is desirable to employ a draw ratio as high as possible, because a higher draw ratio can provide a stretched material of higher strength. The draw ratio is usually 1.5 to 50, preferably 2 to 40, more preferably 3 to 30. In the present invention, the total draw ratio which is the sum of the draw ratio upon rolling and that upon stretching can be set usually at 20 or more, preferably 30 or more, more preferably 60 or more, particularly preferably 80 to 200. Such a total draw ratio is desirable.

When stretching is carried out in a solid state, the compression molding step and/or the rolling step, each of which is carried out prior to the stretching step, is carried out desirably at a temperature lower than the melting point [$Tm0$ (°C.)] of the ultra-high-molecular-weight polyethylene used. When the compression molding step and/or the rolling step is conducted at a temperature higher than $Tm0$, the subsequent stretching step may be adversely affected. Incidentally, in the solid-state compression molding step and/or the solid-state rolling step, it is preferable that the melting point [$Tm1$ (°C.)] of the compression-molded material or the rolled material satisfy the following formula.

$$Tm1 \geq Tm0-5$$

When stretching is carried out in a solid state, it is possible, in the compression molding step conducted prior to the stretching step, to allow a liquid organic compound such as decalin, xylene, n-paraffin or the like to exist together with the polyethylene to an extent that the objects of the present invention are not impaired. In the compression molding step and/or the rolling step, it is also possible to allow a functional group-containing resin or a silane modification product thereof to exist together with the polyethylene. Examples of the functional group-containing resin are a modified ethylene (co)polymer obtained by grafting an ethylene polymer or an ethylene-α-olefin copolymer in the presence of an unsaturated carboxylic acid and/or a derivative thereof and an organic peroxide; an ethylene vinyl ester copolymer wherein the comonomer concentration is 30% by weight or less, or a saponification product thereof; and an ethylene-acrylic acid ester copolymer, or a metal salt thereof.

As mentioned above, the polyethylene stretched material can also be produced by dissolving the ultra-high-molecular-weight polyethylene powder in a solvent, forming from the solution a solvent-free gel-like sheet, a fiber or a single crystal precipitation mat or sheet, solidifying it by rolling, extrusion or the like, and subjecting the solid to stretching, or by subjecting the above gel-like sheet itself to stretching without proceeding to the solidification step. The ultra-high-molecular-weight polyethylene to be dissolved in a solvent may be used in the form of its mixture with the above-mentioned functional group-containing resin. In this case, the rolling and stretching conditions are desirably the same as mentioned above.

Thus, a stretched polyethylene material is obtained. The stretched material has a tensile modulus of ordinarily 60

GPa or more, preferably 80 GPa or more, more preferably 120–150 GPa. The stretched material has a tensile strength of ordinarily 0.7 GPa or more, preferably 1.5 GPa or more, more preferably 2 GPa or more. The stretched material has various forms such as fiber, tape, sheet and the like, depending upon the production method. The form of the stretched material is preferably a sheet or a tape in view of the splitting treatment to be conducted later. The sheet or tape refers to a stretched material whose cross-section has different dimensions in the two parallel directions and the other parallel directions, and has a width of at least 1 mm (generally about 1 mm to 1 m) and a thickness of about 10–500 μm.

Splitting

The split stretched polyethylene material of the present invention can be produced by splitting the ultra-high-molecular-weight polyethylene stretched material obtained above. Splitting can be carried out by using a known splitting method and has no particular restriction. As the splitting method, there can be mentioned, for example, mechanical methods such as a method wherein a stretched material having a film shape, a sheet shape or the like is tapped, a method wherein said stretched material is twisted, a method wherein said stretched material is rubbed and a method wherein said stretched material is brushed; a method using an air jet; a method using an ultrasonic wave; and a method using a bomb blast.

Mechanical methods are preferred in the present invention and a rotary type mechanical method is particularly preferred. Examples of such a mechanical method include methods using splitters of various shapes such as tapping screw-like splitter, file-like rough-surface splitter, needle roll-like splitter and the like. Desirably, the tapping screw-like splitter is ordinarily polygonal (pentagonal or hexagonal) and has screw threads of 10–40, preferably 15–35 per inch. Preferably, the file-like splitter is one invented by the present inventors (Japanese Utility Model No. 38980/1976). In this file-like splitter, the surface of the shaft having a circular cross section is a rough surface similar to the surface of a round file for ironworking, and two spiral grooves are formed at equal intervals in the surface.

Figure 3:
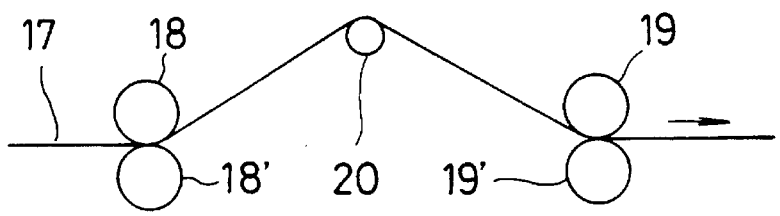
FIG. 3 is an example of the schematic illustration showing the practice of splitting.

The splitting apparatus used in the present invention has no particular restriction. However, as a typical example, there can be mentioned an apparatus as shown in FIG. 3 which consists basically of nip rolls 18,18', nip rolls 19,19' and a rotary splitter 20 arranged between these two sets of nip rolls and wherein a stretched tape 17 is transferred with a tension being applied thereto and is contacted with the rotary splitter. In this case, the transfer speed of the stretched material is not particularly restricted, but is ordinarily 1–1,000 m/min, preferably 20–300 m/min. The rotational line speed (peripheral speed) of the splitter can be appropriately selected depending upon the properties and transfer speed of polyethylene stretched material and the properties of intended split polyethylene stretched material, but is ordinarily 10–3,000 m/min, preferably 50–1,000 m/min. The desirable contact angle between stretched material and splitter is ordinarily 30°–180°, preferably 60°–90°.

In the splitting method by brushing or the splitting method using a rotary splitter, the splitting operation is preferably carried out by applying a tension to the stretched material to be split. Desirably, this tension is applied in such a level that the stretched material undergoes deformation (elongation) of ordinarily 0.1–3%, preferably 0.5–2%, in view of the above-mentioned high tensile modulus of the stretched material. In this case, it is effective to install, in the splitting apparatus, a tension controller in order to keep constant the tension applied to the tape.

The temperature employed in the splitting is ordinarily −20° to +100° C., preferably −5° to +50° C., more preferably 0°–20° C. The splitting can be carried out not only in one stage but also in multiple stages. Specific examples of these methods are described in, for example, U.S. Pat. Nos. 2,185,789, 3,214,899, 2,954,587, 3,662,935 and 3,693,851 and Japanese Patent Publication Nos. 13116/1961 and 16909/1968.

In the split stretched polyethylene materials obtained by these methods, the split yarn thickness is ordinarily 10–200 μm, preferably 30–100 μm. When the thickness is smaller than 10 μm, it occurs in some cases that the stretched material of film or sheet shape tears in the lengthwise direction and that the fibrils formed by splitting cause fluffing or wind round the splitter, making unstable the quality of the split product or the splitting operation. A thickness larger than 200 μm tends to give poor splitting. The width of fine yarn after splitting is ordinarily 10–500 μm, preferably 50–200 μm.

The split stretched polyethylene material of the present invention has features of flexibility and high strength. The strength after splitting is ordinarily 0.4 GPa or more, and it can be increased, by twisting, to substantially the same level as before splitting. The maximum tensile strength when 50–500 times/m of twisting has been applied, is 0.7 GPa or more, generally 1 GPa or more, more generally 1.5 GPa or more. These values correspond to high strengths of about 8 g/d or more, generally about 11.5 g/d or more, more generally about 17 g/d or more.

Impregnation With Thermosetting Resin

In the present invention, the split stretched material obtained above is impregnated with a thermosetting resin, whereby a prepreg is produced. A prepreg having sufficient properties can be produced by impregnating a split stretched material itself with a thermosetting resin; however, a prepreg having even higher properties can be produced by subjecting a split stretched material to a surface treatment and then impregnating the resulting material with a thermosetting resin or by subjecting a stretched material to a surface treatment and a splitting treatment in this order and then impregnating the resulting material with a thermosetting resin.

For the surface treatment, any method can be used as long as it can modify the surface of a stretched material or a split stretched material. There can be mentioned, for example, a corona treatment, a plasma treatment, a chemical oxidation treatment, a flame treatment, an electron beam treatment and an ultraviolet treatment. The conditions of the surface treatment are appropriately selected depending upon the method employed. For example, in the corona treatment, an appropriate gap is set between an electrode connected to a high-voltage generator and a metal covered with a polyester film or the like, and 1–50 kW and a frequency of 100–500 kHz are applied; in the plasma treatment, an ordinary method (treatment under vacuum) is employed; in the chemical oxidation treatment, a mixed solution of concentrated nitric acid and potassium chromate is used; in the flame treatment, there is used a special burner capable of heating only the front surface of a stretched material and, optionally, the back surface is cooled. The electron beam treatment is ordinarily conducted at 0.01–100 Mrad. The ultraviolet treatment is preferably conducted ordinarily by applying an ultraviolet light of 200–400 nm at 180 μW·sec/cm$^2$ or more. Prior to the surface treatment, the oily components adhering to the surface of the material to be surface-treated are preferably removed with a solvent.

In the present invention, a split stretched material or a surface-treated material thereof is impregnated with a thermosetting resin and then is cured as necessary to obtain a prepreg.

The thermosetting resin used as a matrix resin has no particular restriction, and there are generally mentioned thermosetting resins such as epoxy resin, phenolic resin, unsaturated polyester resin and the like.

As the epoxy resin, there can be used any epoxy resin of glycidyl ether type, glycidyl ether ester type, glycidyl ester type, glycidylamine type, linear aliphatic epoxide type and alicyclic epoxide type. Specific examples of the glycidyl ether type epoxy resin are a bisphenol A diglycidyl ether type epoxy resin, a bisphenol A di-β-methylglycidyl ether type epoxy resin, a bisphenol F diglycidyl ether type epoxy resin, a tetrahydroxyphenylmethane tetraglycidyl ether type epoxy resin, a resorcinol diglycidyl ether type epoxy resin, a brominated bisphenol A diglycidyl ether type epoxy resin, a chlorinated bisphenol A diglycidyl ether type epoxy resin, a novolac diglycidyl ether type epoxy resin, an orthocresol novolac diglycidyl ether type epoxy resin, a polyalkylene glycol diglycidyl ether type epoxy resin, a hydrogenated bisphenol A glycidyl ether type epoxy resin, a bisphenol A alkylene oxide-added diglycidyl ether type epoxy resin, an epoxy urethane resin, a glycerine triglycidyl ether type epoxy resin, a pentaerythritol glycidyl ether type epoxy resin and (glycidyl ether phenyl)methane. Examples of the glycidyl ether ester type epoxy resin are a p-oxybenzoic acid glycidyl ether type epoxy resin. Examples of the glycidyl ester type epoxy resin are a diglycidyl phthalate type epoxy resin, a diglycidyl tetrahydrophthalate type epoxy resin, a diglycidyl hexahydrophthalate type epoxy resin, a glycidyl acrylate type epoxy resin and a diglycidyl alcohol-dimer acid ester type epoxy resin. Examples of the glycidylamine type epoxy resin are a glycidylaniline type epoxy resin, a tetraglycidylaminodiphenylmethane type epoxy resin and a triglycidyl isocyanurate epoxy resin. Examples of the linear aliphatic epoxy resin are an epoxidized polybutadiene and an epoxidized soybean oil. Examples of the alicyclic epoxy resin are 3,4-epoxy-6-methylcyclohexylmethyl 3,4-epoxy-6-methylcyclohexanecarboxylate, 3,4-epoxycyclohexylmethyl (3,4-epoxycyclohexane)carboxylate, bis(3,4-epoxy-6-methylcyclohexylmethyl) adipate, vinylcyclohexene diepoxide, dicyclopentadiene oxide, bis(2,3-epoxycyclopentyl) ether and limonene dioxide.

There can also be used modified epoxy resins (e.g. epoxy resin modified with terminal carboxylated butadiene-acrylonitrile rubber), reactive diluents (e.g. n-butyl glycidyl ether) and epoxy resins mixed with a plasticizer (e.g. dibutyl phthalate) or a solvent (e.g. toluene, methyl ethyl ketone).

The molecular weight of the epoxy resin is not particularly restricted but is ordinarily about 250–300. The epoxy equivalent is about 100–300.

As the phenolic resin, there can be used various types such as resole type, novolac type and the like. Specifically, there can be used various types of phenolic resins obtained by reacting a phenol (e.g. phenol, cresol, xylenol, ethylphenol, phenylphenol, tert-butylphenol, bisphenol A, resorcinol) and an aldehyde (e.g. formaldehyde, paraformaldehyde, hexamethylenetetramine, furfural) in the presence of a catalyst (e.g. organic acid, inorganic acid, base, salt thereof) in given conditions, as well as modified resins thereof.

As the unsaturated polyester resin, there can be used various types and there is no particular restriction. For example, there can be mentioned, unsaturated polyester resins obtained by using an unsaturated alkyd (e.g. unsaturated polybasic acid, saturated polybasic acid, glycol) and a crosslinking agent (e.g. vinyl monomer) as main raw materials and reacting them under given conditions. The unsaturated alkyd includes, for example, maleic anhydride, fumaric acid, citraconic acid, itaconic acid, tetrachlorophthalic anhydride, tetrabromophthalic anhydride, phthalic anhydride, isophthalic acid, terephthalic acid, endomethylenetetrahydrophthalic anhydride, tetrahydrophthalic anhydride, hexahydrophthalic anhydride, succinic acid, adipic acid, azelaic acid, sebacic acid, ethylene glycol, propylene glycol, butanediol, diethylene glycol, triethylene glycol, dipropylene glycol, pentanediol, hexanediol, neopentyl glycol, 2,2,4-trimethylpentanediol-1,3, hydrogenated bisphenol A, 2,2-di(4-hydroxypropoxyphenyl)propane, pentaerythritol diallyl ether, trimethylene glycol and 2-ethyl-1,3-hexanediol. The vinyl monomer includes, for example, styrene, vinyltoluene, chlorostyrene, α-methylstyrene, divinylbenzene, methyl methacrylate, methyl acrylate, vinyl acetate, diallyl phthalate, triallyl cyanurate, diallyl benzenesulfonate, N-vinylpyrrolidone and maleimide.

Of the above thermosetting resins, the epoxy resin is preferred in view of the adhesivity and other properties.

As mentioned above, in the present invention, a split stretched material or a surface-treated material thereof is impregnated with a thermosetting resin and then is cured as necessary to obtain a prepreg. The manner of impregnation is not particularly restricted and can vary depending upon the application of the prepreg obtained. For example, a split stretched material of tape- or sheet-shape is laminated into one to plural layers as it is or after being expanded to an appropriate width, and the laminate consisting of at least one layer is used as a base material to be impregnated. When a base material consisting of two or more layers is used, the split stretched material is laminated ordinarily in the lengthwise direction as it is; however, it is possible in some cases to carry out lamination in different directions by, for example, expanding a tape, cutting it in an original tape width and laminating the cut tapes so that the adjacent two layers are at right angles. It is also possible to make the split stretched material into a fabric of plain weave, twill weave, satin weave, unidirectional weave or the like and then impregnating the fabric. It is further possible to prepare a roving of the split stretched material, applying filament winding, drawing or the like to the roving to convert into a pipe form, a rod form or the like, and impregnating it with a resin.

In impregnating a split stretched material with a thermoseting resin, there can be used any of a wet method using a liquid resin at room temperature and a dry method using a resin solution. For example, a split stretched material is coated with, immersed in, or sprayed with a liquid resin or a resin solution. The detailed conditions of such an operation can be appropriately selected. The viscosity of the liquid resin or resin solution, for example, is determined in view of (a) the workability and moldability in the impregnation method to be employed, or (b) the properties of the molded material to be obtained. Specifically, the viscosity is appropriately determined by controlling the molecular weight, epoxy equivalent, etc. in the case of an epoxy resin, by controlling the amount of solvent in resin solution in the case of a phenolic resin, and in view of the type and amount of unsaturated monomer in the case of an unsaturated polyester.

The resin content in prepreg varies depending upon the application of the prepreg to be obtained, but desirably is ordinarily 20–200% by volume, preferably 40–100% by volume, more preferably 50–70% by volume.

The method for curing after impregnation can also be appropriately selected depending upon the type and amount of the thermosetting resin used for impregnation, as long as the curing is carried out at temperatures not higher than the melting point of the stretched polyethylene material. For example, when an epoxy resin is used as an impregnant, the curing can be conducted by using an appropriately selected curing agent. Such a curing agent includes amines such as diethyleneamine, triethylenetetramine, diethylamine, propylamine, metaxylylenediamine, menthanediamine, heterocyclic diamines and the like; acid anhydrides such as chrolendic anhydride and the like; polyamide resins; and so forth. The curing time is not particularly restricted but is ordinarily about 0.5–1 hour. The curing is carried out at normal pressure or under pressure (ordinarily 10 kg/cm$^2$ or less).

When a phenolic resin is used, the curing can be easily conducted by adopting a heating and drying step. The curing conditions are not particularly restricted as long as it is conducted at temperatures not higher than the melting point of the stretched polyethylene material, but is ordinarily conducted at temperatures of 20° C. to less than the melting point of the stretched polyethylene material, for about 0.5 hour to 1 week, at normal pressure or under pressure.

When an unsaturated polyester resin is used, the curing can be easily conducted by adding an organic peroxide catalyst and a radical-generating agent (e.g. accelerator) and conducting a reaction under known conditions. Needless to say, the curing temperature is preferably not higher than the melting point of the stretched polyethylene material. Said organic peroxide includes benzoyl peroxide, 1,1-bis(tert-butylperoxy)-3,3,5-trimethylcyclohexane, 1,1-bis(tert-butylperoxy)cyclohexane, 2,2-bis(tert-butylperoxy)octane, n-butyl 4,4-bis(tert-butylperoxy)valerate, dicumyl peroxide, α,α'-bis(tert-butylperoxy-m-isopropyl)benzene, 2,5-dimethyl-2,5-di(tert-butylperoxy)hexane, 2,5-dimethyl-2,5-di(tert-butyl-peroxy)hexyne-3, tert-butyl peroxypivalate, tert-butyl peroxy(2-ethylhexanoate), tert-butyl peroxylaurate, tert-butyl peroxybenzoate, 2,5-dimethyl-2,5-di(t-benzoylperoxy)hexane, etc.

The prepreg of the present invention is produced as above.

The present invention is hereinafter described specifically by way of Examples. However, the present invention is by no means restricted by the Examples.

EXAMPLE 1

(1) Specification of Compression-Molding Apparatus

| 1. Rolls | Diameter: 500 mm |
| | Face length: 300 mm |
| 2. Steel belts | Thickness: 0.6 mm |
| | Width: 200 mm |
| 3. Small-diameter rollers | Diameter: 12 mm |
| | Face length: 250 mm |
| 4. Platens | Length: 1,000 mm |
| | Width: 200 mm |
| 5. Hydraulic cylinders | Diameter: 125 mm |

Using a compression-molding apparatus of the above specification, a powder of an ultra-high-molecular-weight polyethylene having a viscosity-average molecular weight of about 2,000,000 was heated to 130° C. and pressed at an average pressure of about 6 kg/cm$^2$, whereby a compression-molded sheet of 1.1 mm in thickness and 100 mm in width was continuously produced at a speed of 1 m/min.

The sheet was then fed between a pair of upper and lower rolls opposed to each other, maintained at a surface temperature of 140° C., rotated in opposite directions at the same peripheral line speed of 1 m/min, having a diameter of 150 mm and a surface length of 300 mm and disposed at an interval of 30 μm, whereby the sheet was rolled into a film having a draw ratio of 7.

(2) Specification of Stretching Apparatus

| 1. Heating rolls | |
| --- | --- |
| Preheating metal rolls | Number of rolls: 3 |
| | Diameter: 250 mmφ |
| | Face length: 200 mm |
| Stretching metal roll | Number of roll: 1 |
| | Diameter: 125 mmφ |
| | Face length: 200 mm |
| A heat transfer oil is circulated inside each roll. | |
| The gap between any two adjacent rolls is 30 mm. | |
| 2. Cooling metal rolls | Number of rolls: 3 |
| | Diameter: 250 mmφ |
| | Face length: 200 mm |
| Water is circulated inside each roll. | |
| 3. Nip rolls | |
| Inlet side: | A 200 φ silicone rubber roll nips the two preheating metal rolls. |
| Outlet side: | A 200 φ silicone rubber roll nips the two cooling metal rolls. |

The rolled sheet of 150 μm in thickness was cut into a width of 5 mm and then subjected to stretching using a stretching apparatus of the above specification.

Stretching was conducted three times under the conditions as shown in Table 1. The total draw ratio including the draw ratio by rolling was 105. By this stretching was obtained a stretched tape of 2 mm in width and 70 μm in thickness. The stretched tape had a tensile strength of 2.0 GPa and a modulus of 90 GPa.

TABLE 1

| | Metal roll temperature (°C.) | | Nip roll circumferential speed (m/min) | | Draw ratio |
| --- | --- | --- | --- | --- | --- |
| | Preheating | Stretching | Inlet | Outlet | (times) |
| First | 135 | 140 | 1 | 4 | 4 |
| Second | 140 | 145 | 4 | 10 | 2.5 |
| Third | 140 | 150 | 10 | 15 | 1.5 |
| Total | | | | | 15 |

(3) Splitting

The stretched tape was split by a splitting apparatus as shown in FIG. 3. That is, the stretched tape 17 was split by a splitter 20 between nip rolls 18,18' and nip rolls 19,19'.

The conditions used for the splitting were as follows.

Film speed: 20 m/min

Figure 4:
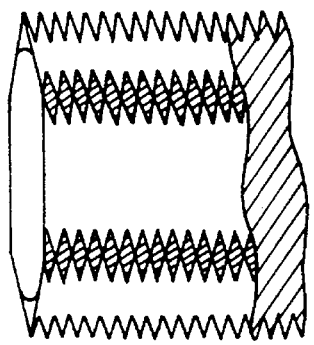
FIG. 4 is an example of the tapping screw-like splitter used in Example 1.

Splitter: A hexagonal rod having, at one end, projections similar to a tapping screw having 32 threads per inch (FIG. 4). Maximum diameter: 25 mmφ

Rotational speed of splitter: 800 rpm (4) Production of Prepreg

The split stretched tape obtained above was made into a fabric of 50 cm in width [the weaving density (the number of warp tapes and filling tapes per unit distance) was 15 tapes/inch in the lengthwise direction and 12 tapes/inch in the crosswise direction], using a handloom. The both sides of the fabric was subjected to a corona discharge treatment (voltage=30 kV, frequency=30 kHz, treatment speed=5 m/min, electrode-to-electrode gap=2 mm, wettability=54 dyne/cm or more).

The fabric after the corona treatment was immersed in an epoxy resin-curing agent mixture consisting of 100 parts by weight of an epoxy resin (EPO-TOHTO YDF-170 manufactured by Tohto Kasei Co., Ltd.) and 30 parts by weight of a curing agent (AMICURE PN-23 manufactured by Ajinomoto Co., Ltd.). The resin-impregnated fabric was passed through multi-stage nip rolls to remove the excessive portion of the resin, and a fabric having a resin layer of about 35 μm in thickness on each side was wound up by a roll together with a release paper to continuously produce a fabric prepreg.

(5) Production of Fabric Laminate

The above obtained fabric prepreg was cut into squares each of 30 cm×30 cm. Five of these squares were laminated, then interposed between two stainless steel plates, and subjected to press molding at 80° C. at a pressure of 5 kgf/cm² for 1 hour to obtain a fabric laminate of about 1 mm in thickness.

EXAMPLE 2

An ultra-high-molecular-weight polyethylene powder containing 5% by weight of an adhesive polyethylene resin powder [N POLYMER A 1600 (trade name) manufactured by Nippon Petrochemicals Co. Ltd.] was subjected to the same compression molding and rolling as in Example 1.

The resulting rolled sheet of 150 μm in thickness and 100 mm in width was cut by 10 mm at each end to make a sheet of 80 mm in width. This sheet was subjected to stretching and splitting using the same apparatuses and conditions as in Example 1. Incidentally, the stretched tape before splitting had a tensile strength of 2.5 GPa and a modulus of 105 GPa.

This split stretched tape was expanded to a width of 100 mm. Three of these expanded tapes were laminated and immersed in an epoxy resin-curing agent mixture consisting of 100 parts by weight of an epoxy resin (EPICOAT 828 manufactured by Shell Chemical Co., Ltd.) and 30 parts by weight of a curing agent (AMICURE PN-23 manufactured by Ajinomoto Co., Ltd.). The resin-impregnated laminate was passed through multi-stage nip rolls to remove the excessive portion of the resin, and a laminate having a resin layer of about 30 μm in thickness on each side was wound up by a roll together with a release paper, to continuously produce a prepreg.

The prepreg was cut into squares each of 10 cm×10 cm. Six of these squares were laminated so that the adjacent two squares were at right angles. The laminate was interposed between two stainless steel plates and subjected to press molding at 80° C. at a pressure of 4 kgf/cm² for 1 hour to obtain a laminate of about 0.5 mm in thickness. The laminate had tensile strengths of 0.33 GPa in the MD and 0.30 GPa in the CD and tensile moduli of 17 GPa in the MD and 18 GPa in the CD.

EXAMPLE 3

A fabric prepreg was continuously produced in the same manner as in Example 1 except that (a) prior to the rolling of the ultra-high-molecular-weight polyethylene sheet, the both sides of the polyethylene sheet was covered with a 25 μm-film of a silane-treated ethylene-ethyl acryalte copolymer resin [HPR-AS 25 (trade name) manufactured by Mitsui-DuPont Polychemical Co.], after which rolling was conducted, (b) the resulting fabric was subjected to a corona treatment, and (c) the matrix resin (the impregnant resin) used was an unsaturated polyester (ESTER R235 AN-1 manufactured by Mitsui Toatsu Chemicals, Inc.) and the curing agent used was 1 part by weight of an organic peroxide (PERMEK N manufactured by NIPPON OIL & FATS CO., LTD.).

EXAMPLE 4

A fabric laminate of 30 cm×30 cm×1 mm (thickness) was obtained in the same manner as in Example 1 except that the weaving density was 10 tapes/inch in the lengthwise direction and 9 tapes/inch in the crosswise direction. The laminate had tensile strengths of 0.57 GPa in the MD and 0.51 GPa in the CD and tensile moduli of 26 GPa in the MD and 24 GPa in the CD.

COMPARATIVE EXAMPLE 1

A fabric was produced in the same manner as in Example 1, using a material obtained by gel spinning, i.e. DYNEEMA SK-60 of 1,600 d (a bundle of 1,600 filaments each of 12 μm in diameter) manufactured by TOYOBO CO., LTD. but without applying any splitting treatment. Then, it was tried to make the fabric into a prepreg; however, the fabric, its warps, in particular, underwent severe damage during weaving and the whole surface of the fabric had fluffing, making it impossible to obtain a prepreg having satisfactory appearance and properties.

COMPARATIVE EXAMPLE 2

A fabric was produced in the same manner as in Example 1, using a material obtained by gel spinning, i.e. DYNEEMA SK-60 of 1,600 d (a bundle of 1,600 filaments each of 12 μm in diameter) manufactured by TOYOBO CO., LTD. Then, it was tried to make the fabric into a prepreg. Incidentally, in order to allow the fabric to have the same weight per unit volume as in Example 4, the weaving density used was 2 tapes/inch in the lengthwise direction and 1.75 tapes/inch in the crosswise direction. In the fabric production, the warps, in particular, underwent severe damage and the whole surface of the fabric had fluffing; consequently, no prepreg having satisfactory appearance comparable to that of Example 1 could be obtained. A laminate of 30 cm×30 cm×1 mm (thickness) was produced in the same manner as in Example 4, but it had tensile strengths of 0.43 GPa in the MD and 0.39 GPa in the CD and tensile moduli of 14 GPa in the MD and 13 GPa in the CD. Thus, there could be obtained neither prepreg nor laminate each having satisfactory appearance and properties as possessed by those of the present Examples.

EXAMPLE 6

A fabric laminate of 30 cm×30 cm×1 mm (thickness) was obtained in the same manner as in Example 1 except that the weaving density used was 8 tapes/inch in both the lengthwise direction and the crosswise direction. The laminate had tensile strengths of 0.51 GPa in the MD and 0.49 GPa in the CD and tensile moduli of 24 GPa in the MD and 28 GPa in the CD.

Melting point and other properties were measured as follows.

Melting Point

A sample (5 mg) was set in a DSC apparatus. The sample was heated at a temperature-elevation rate of 10° C./min. The endothermic peak temperature obtained was recorded as its melting point.

Tensile Strength, Tensile Modulus and Bonding Strength

Tensile strength and tensile modulus were measured at 23° C. at a tensile speed of 100 mm/min, using a tensile testing machine "Strograph R". The tensile modulus was calculated using the stress at 0.1% strain. The cross-sectional area of a test piece, said area being needed for the calculation, was determined by measuring the weight and length of the test piece under an assumption that the density of polyethylene be 1 g/cm³.

What is claimed is:

1. A process for preparing a prepreg, which comprises stretching a material comprising, as a main component, an ultra-high-molecular-weight polyethylene having an intrinsic viscosity of 5–50 dl/g as measured at 135° C. in decalin, to a total draw ratio of at least 20, subjecting the resulting stretched polyethylene material to a splitting treatment using a tapping screw-like splitter or a file-like splitter such that the split yarn thickness is 10–200 μm and the split yarn width is 10–500 μm, and impregnating the resulting material with a thermosetting resin at a temperature not higher than the melting point of the stretched polyethylene material.

2. The process according to claim 1, wherein the total draw ratio is the sum of the draw ratio upon rolling and the draw ratio upon stretching.

3. The process according to claim 2, wherein the compression-molding is carried out by holding the polyethylene material between endless belts and transferring the endless belts.

4. The process according to claim 2, wherein the compression-molding is carried out at a temperature lower than the melting point of the ultra-high-molecular-weight polyethylene.

5. The process according to claim 2, wherein the total draw ratio is 80–200.

6. The process according to claim 5, wherein the splitting treatment is carried out at a transfer speed of the stretched polyethylene material, of 10 m/min to 3,000 m/min at a contact angle between the stretched polyethylene material and the splitter, of 30°–150° under such a tension that the stretched polyethylene material undergoes an elongation of 0.1–3%.

7. The process according to claim 1, wherein the split stretched polyethylene material has a thickness of 30–100 μm.

8. The process according to claim 1, which comprises subjecting the stretched polyethylene material to a splitting treatment and a surface treatment and then impregnating the resulting material with a thermosetting resin.

9. The process according to claim 7, wherein the surface treatment is carried out by a corona treatment, a plasma treatment, a chemical oxidation treatment, a flame treatment, an electron beam treatment or an ultraviolet treatment.

10. The process according to claim 1, wherein the thermosetting resin as an impregnant is selected from the group consisting of an epoxy resin, a phenolic resin and an unsaturated polyester resin.

11. The process according to claim 1, wherein the content of the thermosetting resin in the prepreg is 20–200% by volume.

12. A prepreg obtained by stretching a material comprising, as a main component, an ultra-high-molecular-weight polyethylene having an intrinsic viscosity of 5–50 dl/g as measured at 135° C. in decalin, to a total draw ratio of at least 20, subjecting the resulting stretched polyethylene material to a splitting treatment such that the split yarn thickness is 10–200 μm and the split yarn width is 10–500 μm, and impregnating the resulting material with a thermosetting resin.

13. The process according to claim 1, wherein the stretched polyethylene material is formed as a tape or sheet.

14. The process according to claim 13, wherein the stretched polyethylene tape or sheet material has a width of 1 mm to 1 m and a thickness of 10–500 μm.

15. The prepreg according to claim 12, wherein the stretched polyethylene material is formed as a tape or sheet.

* * * * *